Patented Jan. 5, 1932

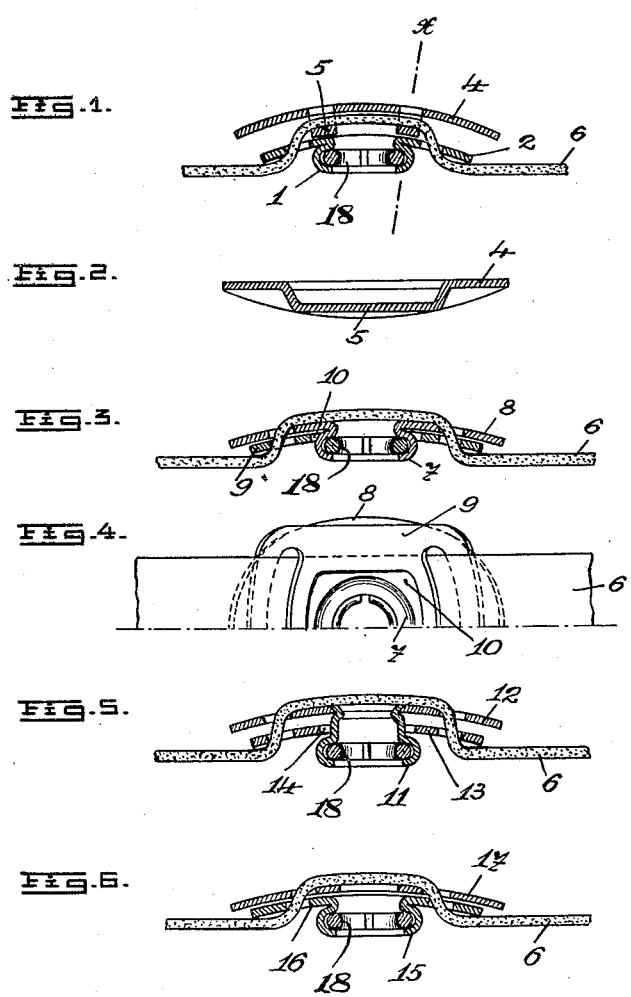

1,839,574

UNITED STATES PATENT OFFICE

EDUARD MERZINGER, OF PRAGUE-VRSOVICE, CZECHOSLOVAKIA

ADJUSTABLE FASTENER FOR GLOVES AND SHOES

Application filed December 22, 1928, Serial No. 327,898, and in Czechoslovakia October 12, 1928.

Adjustable fasteners are known which consist of two superposed plates with coinciding openings.

The present invention consists in an adjustable fastener in which one of the plates is provided with a socket member in order to secure the plate to the material held in the fastener. The arrangement may be such that the plates are loosely superposed or are connected to one another by means of the socket member, in which case a relative lateral movement of the plates is rendered possible.

One form of construction of the fastener is illustrated by way of example in the annexed drawings, in which Figure 1 is a sectional view of the fastener, Fig. 2 is a section through the outer plate taken on the line $x$—$x$ of Fig. 1, Fig. 3 is a section through a modified construction of the fastener, Fig. 4 is a part plan view of the construction shown in Fig. 3, Fig. 5 is a section through another form of fastener, and Fig. 6 is a section showing still another form.

As shown in Figs. 1 and 2, the socket member 1 forms part of the inner plate 2. The slots in the outer plate 4 are so constructed that narrow strips 5 are stamped out of the plate and are bent at the underside of the plate. The strip of material 6 is thus entirely beneath the outer plate, which may thus be constructed as an ornamental slide.

In the case of the fastener illustrated in Figs. 3 and 4, the socket member 7 is integral with the outer plate 8. The inner plate 9 has a cut-away portion 10 in order to facilitate a relative displacement of the plates.

Fig. 5 shows a form of construction in which the socket member 11 is secured to the outer plate 12. In this case also the inner plate 13 has a central opening which facilitates relative movements of the plates.

Fig. 6 illustrates a form of construction in which, as in Fig. 1, the socket member is integral with the inner plate, and the slots in the two plates 16, 17 are formed by stamping.

In all cases the socket member is secured to the material after the latter has been passed through the slots in the two plates and after drawing together of the material at the parts that project from the fastener.

According to the invention, the fastening device is to be provided with a socket member of the spring button type and this socket member consists of a hollow shaft provided with a shoulder on which bears the slotted ring or spring 18, which is kept in position by rolling over the free end of the hollow shaft, as shown in Figs. 1 and 3-6. It is, therefore, clear that the ball member of the spring button fastener may be introduced in the socket member as explained and by the action of the slotted ring, an engagement with a smaller neck provided on the ball member is secured. The ball member or press stud could just as well be secured to the plate in place of the socket member.

What I claim is:

1. A device for adjustably fastening one part of a snap fastener to a belt or strap particularly for gloves and shoes comprising a buckle consisting of two plates sliding one upon the other and provided with superposed slots, one of said plates having one part of a snap fastener thereon and the belt or strap being adapted to be passed through the slots and is gripped thereby by a relative displacement of the plates and are thus held in adjusted position on the belt or strap.

2. A device for adjustably fastening one part of a snap fastener to a belt or strap particularly for gloves and shoes comprising a buckle consisting of two plates sliding one upon the other and provided with two pairs of superposed slots, one of said plates having one part of a snap fastener secured thereto and the belt or strap being adapted to be passed through the superposed slots and is gripped thereby by a relative displacement of the plates and are thus held in adjusted position on the belt or strap.

3. A device for adjustably fastening one part of a snap fastener to a belt or strap particularly for gloves and shoes comprising a pair of plates having superposed and cooperating slots therein and one part of the snap fastener being secured to one of the parts, the superposed slots being adapted to receive the belt or strap therethrough and the plates being adjustably held on the belt or strap by the relative movement of the plates to adjust the positions of the slots relative to each other.

4. A fastening device of the snap fastener type particularly for gloves and shoes comprising an outer plate having narrow strips stamped therefrom, and an inner plate having slots therein cooperating with the strips, one of said plates having one part of a snap fastener thereon and the material of the glove or shoe passing between the strips and outer plate and through the slots to retain the snap fastener on the material.

5. A fastening device of the snap fastener type particularly for gloves and shoes comprising an outer plate having narrow strips stamped therefrom, and an inner plate having slots therein cooperating with the strips, the material of the glove or shoe passing between the strips and outer plate and through the slots to retain the snap fastener on the material and the snap fastener being associated with the inner plate.

In testimony whereof I affix my signature.

EDUARD MERZINGER.